United States Patent
Marupaduga (10) Patent No.: US 11,349,532 B1
(45) Date of Patent: May 31, 2022

(54) UTILIZING SPR TO MANAGE USER DEVICES SERVED BY MU-MIMO GROUPS

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/092,527

(22) Filed: Nov. 9, 2020

(51) Int. Cl.
*H04B 7/0452* (2017.01)
*H04W 24/08* (2009.01)
*H04W 52/24* (2009.01)
*H04W 64/00* (2009.01)

(52) U.S. Cl.
CPC .......... *H04B 7/0452* (2013.01); *H04W 24/08* (2013.01); *H04W 52/244* (2013.01); *H04W 64/006* (2013.01)

(58) Field of Classification Search
CPC .. H04B 7/0452; H04B 7/0617; H04B 17/102; H04W 24/08; H04W 52/244; H04W 64/006; H04W 4/08; H04W 72/042; H04W 72/121
See application file for complete search history.

(56) References Cited

U.S. PATENT DOCUMENTS 10,321,334 B1 * 6/2019 Marupaduga ......... H04W 16/30
2018/0234141 A1 * 8/2018 Silverman ............ H04B 7/0452

FOREIGN PATENT DOCUMENTS

WO  WO-2020185318 A1 * 9/2020 ............. H01Q 21/06

OTHER PUBLICATIONS

Xie et al. "Measurement-Based Evaluation of Vertical Separation MIMO antennas for Base Station", IEEE Antennas and Wireless Propagation Letters, vol. 11, 2012, pp. 415-418. (Year: 2012).*

* cited by examiner

*Primary Examiner* — Quoc Thai N Vu (57) ABSTRACT

Systems and methods herein disclose determining anchor assignment for one or more user devices (UEs). The system comprises at least a first node configured to wirelessly communicate with one or more UEs in a geographic service area. The system determines the location of at least one UE within the geographic area. A sector power ratio for the first node is determined to be above a predetermined threshold. Based on this determination, the system modifies an upper limit of the quantity of UEs that are permitted to be assigned to communicate using the MU-MIMO group to a second upper limit. At least one UE previously assigned to a single user MIMO is re-assigned to the MU-MIMO such that the second upper limit of the MU-MIMO group is not exceeded.

20 Claims, 6 Drawing Sheets

UTILIZING SPR TO MANAGE USER DEVICES SERVED BY MU-MIMO GROUPS

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

The present disclosure is directed, in part, to systems for effectively managing user devices served by a multi-user massive MIMO (MU-MIMO) group. Antenna Sector power ratio (SPR) information is employed to dynamically combat the negative impacts of noise and interference at a cell site and utilizing SPR information to modify an upper limit of a quantity of user devices permitted to be assigned to an MU-MIMO group.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION OF DRAWINGS

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. With the increase in use of MU-MIMO as opposed to traditional antenna arrays, there is an increase in the number of antenna elements compared to the traditional antenna arrays. For example, MU-MIMO antenna arrays may comprise 64 elements while traditional antenna arrays may have only included eight or 16 elements. While the technological advances provide numerous advantages for wireless telecommunications, it creates challenges related to key performance indicators, including interference and diminishing channel quality. High interference results in higher re-transmission rate and diminished user experiences.

When MU-MIMO antenna arrays are employed, multiple UEs are sharing the same resources to improve spectral efficiency. MU-MIMO grouping requires angular separation between users and the base station. The greater the angular separation, the less interference that occurs during a wireless communication session. However, one challenge presented with the use of MU-MIMO technology is the increase of situations where there is high antenna sector power ratio. SPR is defined as a measure of an antenna's ability to minimized interference. It is an expression of RF power radiated outside a sector versus the RF power radiated and retained within the sector. Generally, a low SPR value is about 2-4% while a high SPR value might be 8% or more. As antenna arrays become more sophisticated and use more and more elements, it results in greater challenges with maintaining desired signal levels, which leads to higher SPR values and more interference. As such, it is an objective of the present disclosure to provide systems and methods which incorporate dynamic mechanisms to optimize user experiences based on SPR determinations.

Currently, MU-MIMO groups are capped at a certain number of users and cannot adapt to a situation in which there is high SPR. For example, an MU-MIMO group may be capped at eight users. The systems and methods provided herein can alleviate one or more of the problems mentioned by increasing the limit on the number of UEs that can be assigned to an MU-MIMO group. At a high level, the systems and methods disclosed herein provide a system that improves upon the current MU-MIMO grouping system by allowing for the maximum number of users in an MU-MIMO group to be adjusted based on SPR determinations. SPR information, which describes the radio frequency power that is radiated outside of an antenna array's sector relative to the radio frequency power that is radiated and retained within the antenna array's sector, is used to modify the upper limit of a quantity of devices that are permitted to be assigned to communicate using MU-MIMO group to a new upper limit. This allows the system to re-assign a single user MIMO device to the MU-MIMO group dynamically combat noise and interference at a cell site. The negative impacts caused by high-powered undesired RF radiation at a cell site may be reduced or mitigated by reducing the number of users assigned to communicate with the wireless antenna array using a particular wireless communication protocol. In particular, a wireless communication protocol with a high SPR and key performance indicators that exceed threshold values may have limits placed such that the number of users is limited to improve performance for those using that particular wireless communication protocol.

In one aspect, a system disclosed herein manages UEs served by an MU-MIMO group. The system comprises at least a first node that is configured to wirelessly communicate with one or more UEs in a geographic area. The system also comprises one or more processors, that are configured to perform operations comprising determining a location within the geographic area associated with the one or more user devices and determining that the SPR of the first node exceeds a predetermined threshold. Then, based on the determination that the SPR exceeds the predetermined threshold, the system modifies the first upper limit of UEs that are permitted to be assigned to communicate using the MU-MIMO group to a second upper limit. The system then re-assigns at least one UE that was previously assigned to a single user MIMO to an MU-MIMO group. The number of UEs re-assigned to the MU-MIMO group are capped such that the second upper limit of the MU-MIMO group is not exceeded.

In another aspect, a system is provided for managing UEs served by an MU-MIMO group comprising a first node that is configured to wirelessly communicate with one or more UEs in a geographic area and one or more processors. The system determines a first upper limit of a quantity of UEs permitted to be assigned to communicate using the MU-MIMO group. Then, the system determines that the SPR of the first node exceeds a predetermined threshold. Based on the determination that the SPR of the first node exceeds the predetermined threshold, the system modifies a first upper limit of the number of UEs permitted to be assigned to communicate using the MU-MIMO group to a second upper limit. The system also identifies at least one criteria for the one or more UEs and determines that the at least one criteria exceeds a first predetermined threshold. Based on this determination, the system will modify the first predetermined threshold for the at least one criteria to a second predetermined threshold. The system will determine one or more UEs to be re-assigned to the MU-MIMO group from a single user MIMO and re-assign the one or more UEs to the MU-MIMO group from the single user MIMO. The UEs reassigned to the MU-MIMO group will not exceed the second upper limit of the number of UEs permitted to be assigned to communicate using the MU-MIMO group.

In another aspect, a method for managing UEs served by an MU-MIMO group is disclosed. First, it is determined that the SPR of a first node exceeds a predetermined threshold. Then, based on this determination, a first upper limit of a quantity of UEs permitted to be assigned to communicate using an MU-MIMO group is modified to a second upper limit. Then, at least one UE previously assigned to a single user MIMO may be re-assigned to the MU-MIMO group such that the second upper-limit of the MU-MIMO group is not exceeded.

Figure 1:
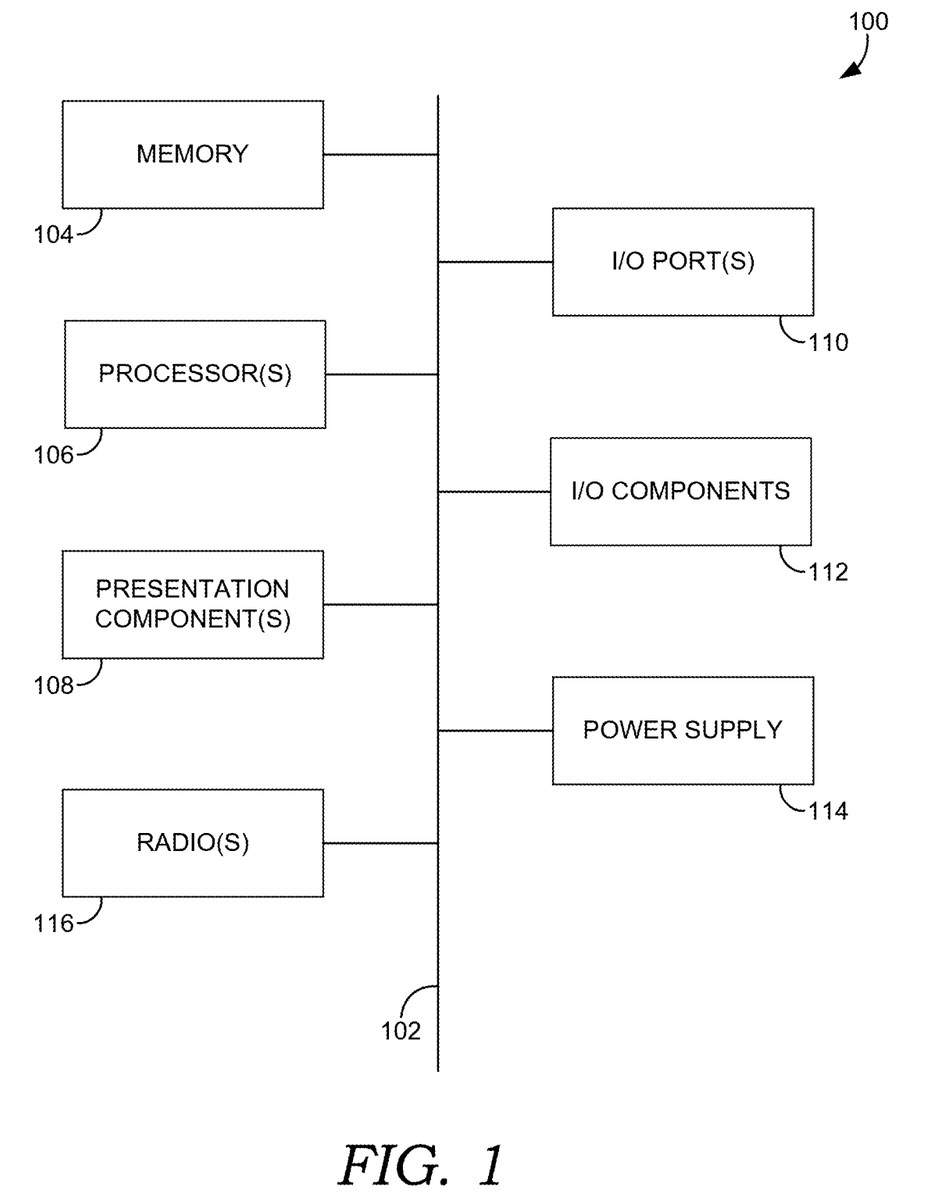
FIG. 1 depicts a diagram of an exemplary computing environment suitable for use in implementations of the present disclosure.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other UE, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, processor(s) 106, radio(s) 116, power supply 114, input/output (I/O) component(s) 112, I/O port(s) 110, and presentation component(s) 108. Bus 102 represents what may be one or more busses (such as an address bus, data bus, or combination thereof). Although the UEs of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as the processor(s) 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Additionally, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes processor(s) 106 that read data from various entities such as bus 106, memory 104 or I/O component(s) 112. Presentation component(s) 108 presents data indications to a person or other device. Exemplary presentation component(s) 116 include a display device, speaker, printing component, vibrating component, etc. I/O port(s) 110 allow computing device 100 to be logically coupled to other devices including I/O component(s) 112, some of which may be built in computing device 100. Illustrative I/O component(s) 112 include a microphone, joystick, game pad, satellite dish, scanner, printer, wireless device, etc.

Radio(s) 116 represents a radio that facilitates communication with a wireless telecommunications network. In aspects, the radio(s) 108 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio(s) 108 might additionally or alternatively facilitate other types of wireless communications including Wi-Fi, WiMAX, LTE, or other VoIP communications. As can be appreciated, in various embodiments, radio(s) 108 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
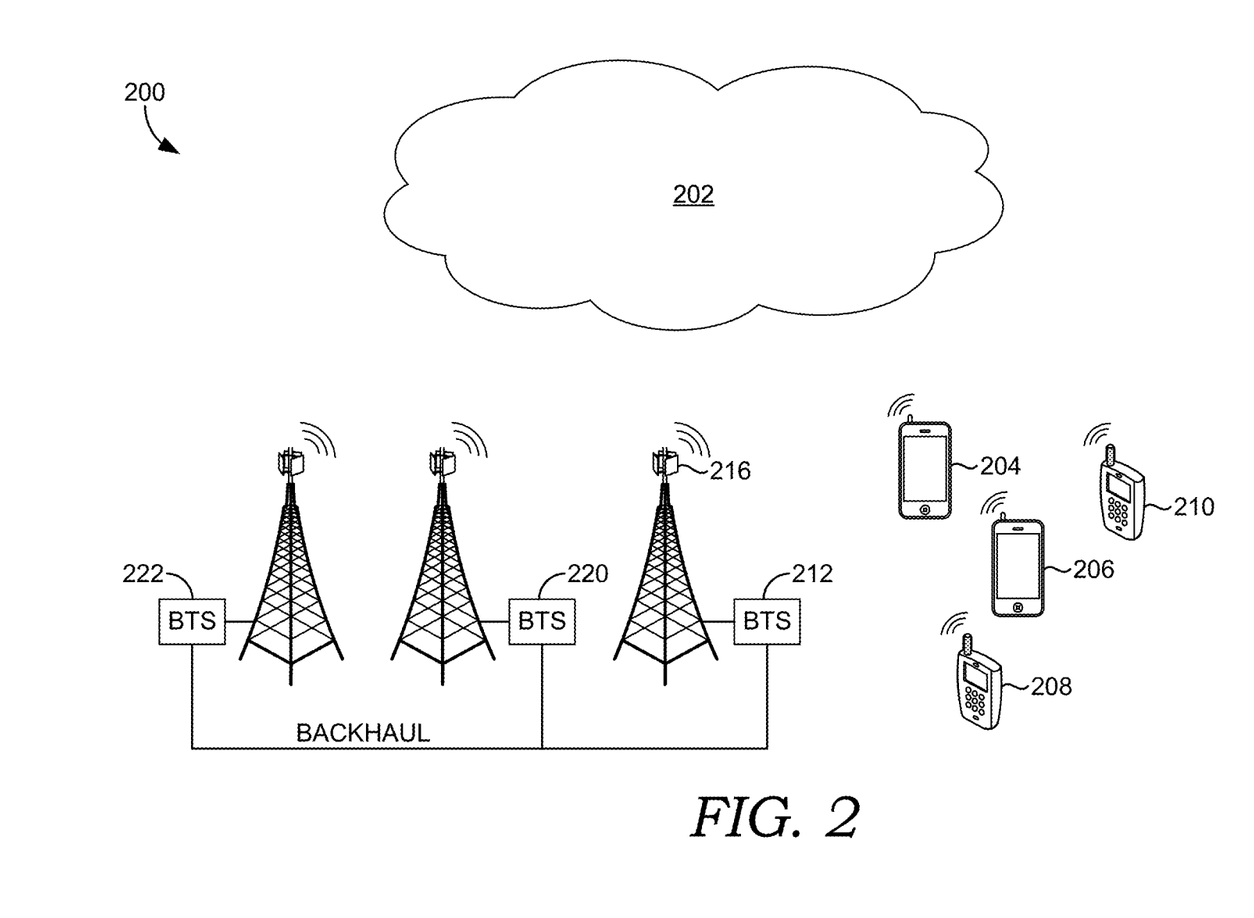
FIG. 2 illustrates an exemplary network environment in which implementations of the present disclosure may be employed.

Next, in FIG. 2, an example of a network environment 200 suitable for use in implementing embodiments of the present disclosure is provided. The network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

The network environment 200 includes a network 202 that provides service to current UEs 204 and 206 and legacy UEs 208 and 210. While two current UEs and two legacy UEs are illustrated in network environment 200, other quantities of UEs may be utilized in aspects herein. UEs 204, 206, 208, and 210 are provided for exemplary purposes only and not for limitation. The network 202 may be accessible through a base station 212 that is connected to a backhaul server (not shown). The base station 212 and/or a computing device (e.g., whether local or remote) associated with the base station 212 may manage or otherwise control the operations of components of a cell site, including an antenna array 216. The base station 212 and/or the computing device associated with the base station 212 may include one or more processors and computer-readable storage media having computer-executable instructions or computer instruction modules embodied thereon for execution by one or more processors.

The antenna array 216 may radiate in a particular direction and thus may correspond to a particular sector of a cell site. The antenna array 216 may have a plurality of antenna elements, in embodiments. In one embodiment, the antenna array 216 is configured to have a plurality of elements that in number, arrangement, and/or density, are configured for MU-MIMO. In one such embodiment, the base station 212 may include a radio and/or a controller, such as a Massive Multiple-Input Multiple-Output Unit for controlling an MU-MIMO configured antenna array, such as the antenna array 216 having a plurality of antenna elements. The base station 212 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store.

The base station 212 may use a radio that is connected to the antenna array 216 by a physical RF path, where the radio is used to cause the antenna array 216 to transmit radio-frequency signals using the plurality of antenna elements. The plurality of antenna elements in the antenna array 216 may include portions of antenna elements (not shown). In embodiments, the plurality of antenna elements of the antenna array 216 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 216 operates in a dual technology mode.

In some embodiments, the antenna array 216 is partitioned such that the first portion of antenna elements is associated with the first access technology and the second portion of antenna elements is associated with the second access technology. When the antenna array 216 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 212 may provide current UE 204 and 206 and legacy UE 208 and 210 with access to the network 202, in embodiments. In some embodiments, the first portion of antenna elements may communicate with current UE 204 and 206 using 5G technology, and the second portion of the antenna elements may communicate with legacy UE 208 and 210 using 4G technology. When operating in the dual technology mode, the antenna array 216 may concurrently connect to and communicate with the current UE 204 and 206 and legacy UE 208 and 210 using, respectively, at least two distinct access technologies.

Accordingly, in one example, when the antenna array 216 is operating in the dual technology mode, the base station 212 concurrently acts as an eNodeB (or "eNB") and gNodeB (or "gNB"). As such, the base station 212 may provide service to one or more access technologies to both current and legacy UE. In addition to communicating with the current UE 204 and 206 and the legacy UE 208 and 210, the base station 212 may also communicate with one or more neighboring base stations. In some embodiments, the base station 212 may communicate with neighboring base station 220 using the first access technology and may communicate with another neighboring base station 222 using the second access technology. For example, because the base station 212 may operate concurrently as an eNodeB and a gNodeB using the antenna array 216 that is partitioned and operating in a dual technology mode, the base station 212 may communicate with other base stations, for example, including legacy base stations that cannot use current access technologies (e.g., 5G) or current base stations that lack backward compatibility with prior access technologies (e.g., 4G). In embodiments, the base station 212 may bi-directionally exchange information with neighboring base stations 220 and 222 through an X2 interface or X2 link. Information regarding signal quality, RF conditions, one or more RLFs, and SINR levels at each of the neighboring base stations 220 and 122, and/or as reported from the UE to the neighboring base stations 220 and 122, may be communicated to the base station 212 via the X2 link. Additionally or alternatively, information regarding signal quality, RLFs, and SINR levels at each of the neighboring base stations 220 and 222 may be communicated to the base station 212 over the backhaul.

As mentioned, the base station 212 may include a radio and/or a controller, such as an MMU, that enables the base station 212 to adjust or modify the operations and transmissions of the plurality of antenna elements in the antenna array 216. In embodiments, the operations, configurations, and/or settings of each antenna element may be individually controlled and adjusted by the base station 212 using the controller. In some embodiments, the operations, configurations, and/or settings of the first portion of antenna elements may be controlled and adjusted as a group by the base station 212 using a controller, such as an MMU, independent of the second portion of antenna elements. In a similar fashion, the operations, configurations, and/or settings of the second portion of antenna elements may be controlled and adjusted as a group by the base station 212 using the controller, independent of the first portion of antenna elements. Accordingly, the base station 212 may use a controller to independently adjust different groups or portions of antenna elements within one antenna array.

In embodiments, the operations, configurations, and/or settings of each individual antenna element may be adjusted and customized. For example, the base station 212 instructs a portion of antenna elements to transmit one or more synchronization signals using a periodicity. In another example, the portion of antenna elements may transmit a plurality of synchronization signals using the periodicity, as instructed by the base station 212. The synchronization signals may be specific to and/or configured for the first access technology, in embodiments.

Accordingly, the base station 212 may use a controller to independently adjust different individual antenna elements, any number of groupings and/or subset(s) of each portion of antenna elements, and/or portions of antenna elements within one antenna array. In embodiments, the base station 212 may use a controller to measure and monitor one or more of throughput, signal quality metrics (e.g., SINR), a quantity of unique users/subscribers, a quantity of unique UE, and/or RLFs.

Figure 3:
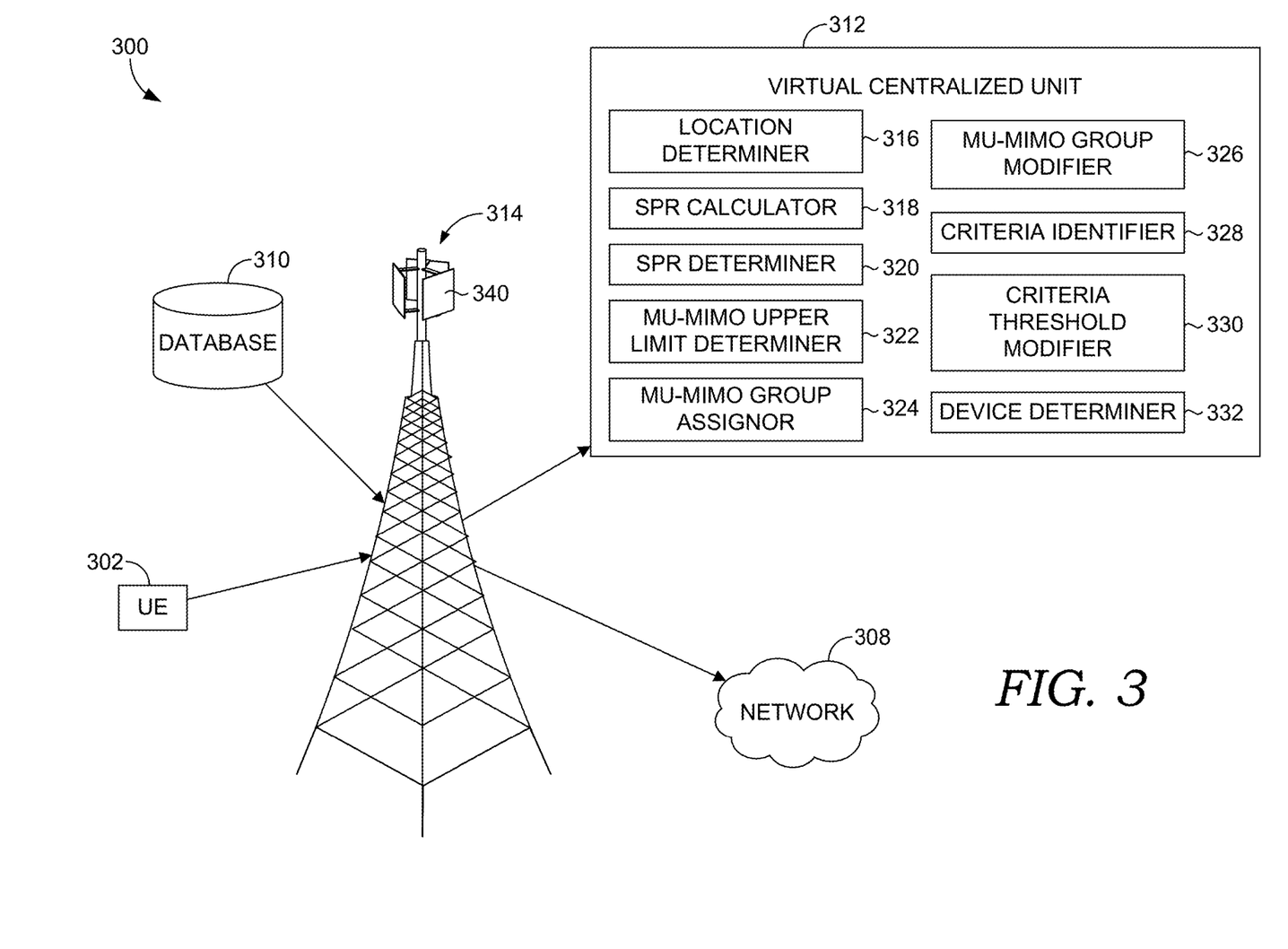
FIG. 3 illustrates a diagram of an exemplary network environment in which implementations of the present disclosure may be employed.

Turning now to FIG. 3, network environment 300 is shown as an exemplary network environment in which implementations of the present disclosure may be employed. Network environment 300 is one example of a suitable network environment and is not intended to suggest any limitation as to the scope of use or functionality of the present disclosure. Neither should the network environment be interpreted as having any dependency or requirement relating to any one or combination of components illustrated.

Network environment 300 includes UE 302 (network environment 300 may contain more UEs), network 308, database 310, virtual centralized unit 312, and cell site 314. In the network environment 300, UE 302 may take on a variety of forms, such as a PC, a UE, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 314 in order to interact with network 308, which may be a public or a private network. While one UE 302 is shown in FIG. 3, UE 302 may be referred to as one or more UEs as it is contemplated that there may be multiple UEs present in other embodiments.

In some aspects, the UE 302 corresponds to a UE or a computing device. For example, the UE may include a display(s), a power source(s) (e.g., a battery), a data store(s), a speaker(s), memory, a buffer(s), a radio(s), and the like. In some implementations, the UE 302 comprises a wireless or mobile device with which a wireless telecommunication network(s) may be utilized for communication (e.g., voice and/or data communication). In this regard, the UE may be any mobile computing device that communicates by way of a wireless network, for example, a 3G, 4G, 5G, LTE, CDMA, or any other type of network.

In some cases, the UE 302 in network environment 300 may optionally utilize network 308 to communicate with other computing devices (e.g., a mobile device(s), a server(s), a personal computer(s), etc.) through cell site 314. The network 308 may be a telecommunications network(s), or a portion thereof. A telecommunications network might include an array of devices or components (e.g., one or more base stations), some of which are not shown. Those devices or components may form network environments similar to what is shown in FIG. 3 and may also perform methods in accordance with the present disclosure. Components such as terminals, links, and nodes (as well as other components) may provide connectivity in various implementations. Network 308 may include multiple networks, as well as being a network of networks, but is shown in more simple form so as to not obscure other aspects of the present disclosure.

Network 308 may be part of a telecommunication network that connects subscribers to their service provider. In aspects, the service provider may be a telecommunications service provider, an internet service provider, or any other similar service provider that provides at least one of voice telecommunications and data services to UE 302 and any other UEs. For example, network 308 may be associated with a telecommunications provider that provides services (e.g., LTE) to the UE 302. Additionally or alternatively, network 308 may provide voice, SMS, and/or data services to UEs or corresponding users that are registered or subscribed to utilize the services provided by a telecommunications provider. Network 308 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 308 may also be, in whole or in part, or have characteristics of, a self-optimizing network.

In some implementations, cell site 314 is configured to communicate with the UE 302 that is located within the geographical area defined by a transmission range and/or receiving range of the radio antennas of cell site 314. The geographical area may be referred to as the "coverage area" of the cell site or simply the "cell," as used interchangeably hereinafter. Cell site 314 may include one or more base stations, base transmitter stations, radios, antennas, antenna arrays, power amplifiers, transmitters/receivers, digital signal processors, control electronics, GPS equipment, and the like. In particular, cell site 314 may be configured to wirelessly communicate with devices within a defined and limited geographical area. For the purposes of the present disclosure, it may be assumed that it is undesirable and unintended by the network 308 that the cell site 314 provide wireless connectivity to the UE 302 when the UE 302 is geographically situated outside of the cell associated with the cell site 314.

In an exemplary aspect, the cell site 314 comprises a base station that serves at least one sector of the cell associated with the cell site 314 and at least one transmit antenna for propagating a signal from the base station to one or more of the UE 302. In other aspects, the cell site 314 may comprise multiple base stations and/or multiple transmit antennas for each of the one or more base stations, any one or more of which may serve at least a portion of the cell. In some aspects, the cell site 314 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 314 is in communication with the virtual centralized unit 312, which comprises a location determiner 316, SPR calculator 318, SPR determiner 320, MU-MIMO upper limit determiner 322, MU-MIMO group assignor 324, MU-MIMO group modifier 326, criteria identifier 328, criteria threshold modifier 330, and device determiner 332. The virtual centralized unit 312 may connect UE 302 and other UEs to frequency bands within range of the UE 302 or other UEs for access to network 308. The virtual centralized unit 312 may communicate with the database 310 for storing and retrieving data.

As discussed, the network environment 300 includes at least a first node (not shown in FIG. 3) that is configured to wirelessly communicate with one or more UEs within a geographic service area. In other aspects, the system may include additional nodes, such as a second node that is also configured to wirelessly communicate with one or more UEs within the geographic service area. As shown, cell site 314 comprises antenna array 340. Antenna array 340 may commutate via a first wireless protocol with one or more UEs. In aspects, the first node utilizes a first wireless communication protocol. The first wireless communication protocol is 5G. However, it is contemplated that the first wireless communication protocol may be LTE, 3G, and the like. Likewise, in aspects that comprise a second node, the second node may utilize a second communication protocol which may be 3G, LTE, 5G, and the like.

Beginning with location determiner 316, the location determiner 316 determines a location within a geographic area associated with one or more UEs, such as UE 302. Location information may comprise GPS or other satellite location services, terrestrial triangulation, an access point location, or any other means of obtaining coarse or fine location information. The location information may indicate geographic location(s) of one or more of a UE, an antenna, a cell tower, a cell site, and/or a coverage area of a cell site, for example. Once the location determiner 316 determines the location of the one or more UEs 302, the location determiner 316 will determine whether or not any of the UEs 302 are in an undesired location. The determination by the location determiner 316 occurs by identifying the latitude and longitude of at least one or more UEs. A UE, such as UE 302, might be located in an undesired location when it falls within the undesired region (shown in FIG. 4). The undesired region is a region in which the SPR value is determined to be higher than a predetermined threshold. Likewise, if the location of the UE is in a durable region, then it is likely that SPR is low, and the virtual centralized unit 312 may not need to take any additional action.

Additionally, location determiner 316 may also receive additional information related to the UE's location such as channel quality information. Channel quality information may indicate the quality of communications between one or more UEs and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more UEs communicating with the cell site, observed SINR and/or signal strength at the UE(s), or throughput of the connection between the cell site and the UE(s). Location and channel quality information may take into account the UE's capability, such as the number of antennas of the UE and the type of receiver used by the UE for detection.

Figure 4:
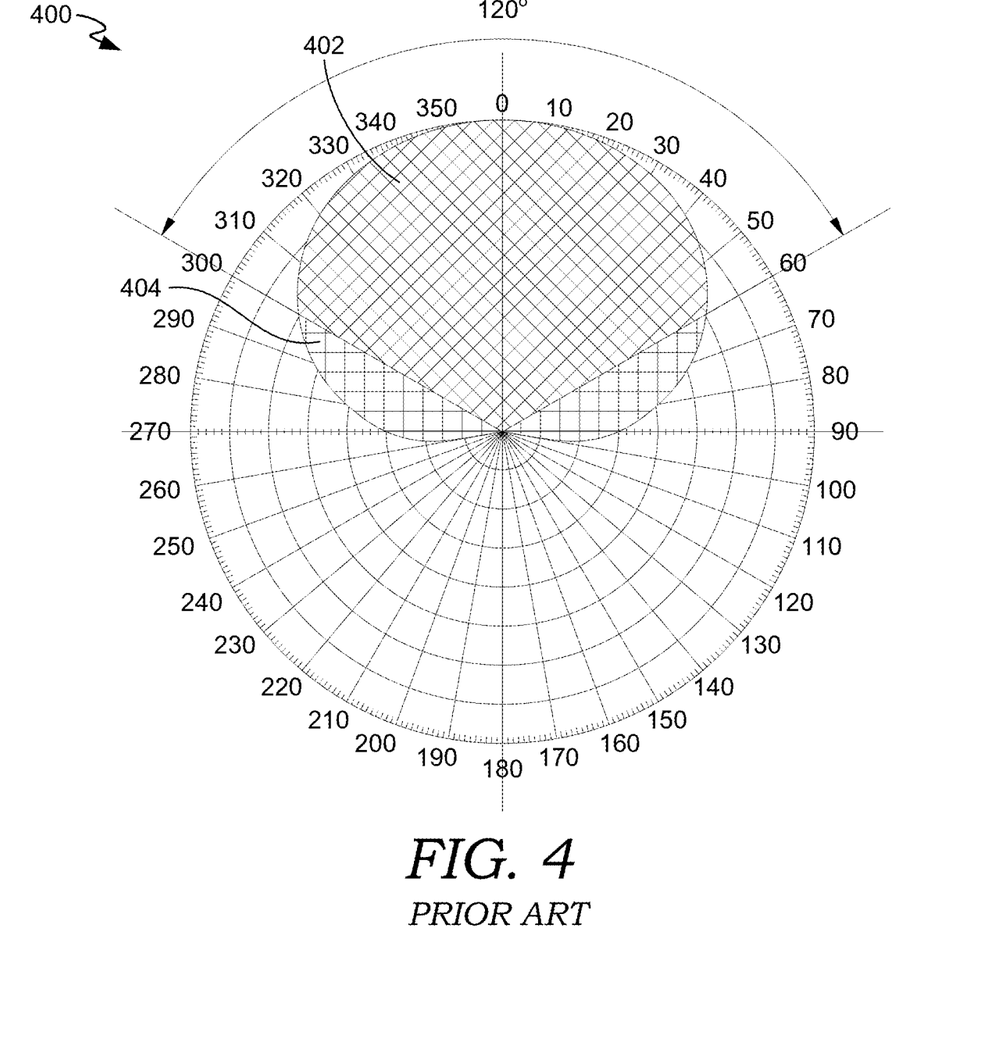
FIG. 4 depicts an exemplary schematic diagram illustrating the desired and undesired regions of SPR, in accordance with an embodiment of the present invention.

SPR values that fall within the desired region 402 may be SPR values that fall below a certain predetermined threshold as shown in FIG. 4. For example, the best performing antennas provide SPRs of about 3-4%. As such, SPR values calculated that fall within the desired region 402 might include any SPR value that is below 4%. When a high SPR value is calculated (e.g. 8%), the SPR value falls within the undesired region 404. After the location determiner 316 determines that one or more UEs are within an undesired region 404, the SPR calculator 318 is triggered to calculate the SPR value for the first node. By contrast, if the location determiner 316 determines that the location of one or more UEs is in the desired region 402, then no additional action is taken as this indicates a low SPR value.

The SPR calculator 318 is configured to calculate the SPR value for the first node, the determined SPR value expressing the RF power radiated outside the sector versus the RF power radiated and retained within the sector. As mentioned, SPR is a measure of an antenna's ability to minimize interference. SPR describes an RF power that is radiated outside of an antenna array's sector relative to an RF power that is radiated and retained within the antenna array's sector. Because SPR is a ratio, SPR may be represented using a percentage value or numerical value. An example of a low SPR value is 3-4%, and an example of a high SPR value is 8-10%. Antennas with greater spillover areas have greater SPR values. SPR information may be used for dynamically combatting interference and noise at a cell site. Additionally, the SPR values of cell site antennas may be used for selection and assignment of specific frequency bands to component carriers of UEs in a telecommunications environment.

Increased or high SPR values have negative impacts, which are exacerbated in LTE environments that allow and facilitate multiple frequency bands and carrier aggregation for combining multiple frequency bands for uplink and/or downlink communications. Negative impacts that high-powered, undesired RF radiation at a cell site causes may be reduced or mitigated by assigning a frequency band of low-SPR antennas to a primary component carrier of a UE. For example, a frequency band that corresponds to a low-SPR antenna may be assigned to the primary component carrier of an inter-carrier aggregation capable device that is geographically located at or near radio frequency "spillover" areas (i.e., radiation outside of an antenna's desired sector at a cell site) and which is experiencing lower throughput.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 314. Due to these measures, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Once the SPR calculator 318 determines the SPR value, the SPR determiner 320 determines that the first node has a SPR value above a predetermined threshold. In aspects, there may be more than a first node present, and as such, the SPR calculator 318 may calculate the SPR values for additional nodes. The first node is configured to wirelessly communicate with one or more UEs in a geographic area. In some instances, the first node may utilize a 5G wireless communication protocol and the second node may utilize an LTE wireless communication protocol.

As mentioned, an example of low a SPR value is 3-4%, while a high SPR value is 8-10%. As such, in aspects, the virtual centralized unit 312 may set a predetermined SPR threshold. For example, the virtual centralized unit 312 may determine that the predetermined SPR threshold is 5%. Any SPR calculations completed by the SPR calculator 318 that are above 5%, in some aspects, may be determined by the SPR determiner 320 to be above the predetermined threshold indicating an unfavorable situation. It is contemplated that the predetermined threshold may not be static, and instead may fluctuate based on, for example, the network 308 requirements.

In some embodiments, the first node that corresponds to a first wireless communication protocol may have an SPR value that is less than an SPR value of another adjacent antenna at the cell site. SPR determiner 320 may also determine, in response to a determination that the wireless communication protocol has a high SPR, that a monitored KPI value has exceeded a threshold value. This determination may be based on an evaluation of the average throughput of the entire sector. The average sector throughput may exceed a predetermined threshold by a particular magnitude determined by SPR determiner 320. Other KPI values monitored may be an individual UE throughput or the data usage for the sector.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the SPR determiner 320 may dynamically determine SPR values of antennas at the cell site when a UE enters the service coverage area of the cell site. Alternatively, SPR determiner 320 may determine SPR values of the antennas at the cell site periodically, the virtual centralized unit 312 storing the SPR values in the database 310 at the base station controlling the cell site 314. Stored SPR values may be referenced when a UE enters a service coverage area of the cell site 314. Additionally or alternatively, SPR values of the antennas at the cell site 314 may be determined for individual antennas when each antenna is installed at the cell site and stored in database 310 at the base station controlling the cell site 314. In this way, dynamically determined or periodically updated SPR values may be compared, for example, by the base station to an initial or installation SPR value so that the performance of each antenna can be monitored, for example.

Based upon the determination that at least one of the first node or the second node has an SPR value that is above a predetermined threshold (e.g., 5%), the MU-MIMO upper limit determiner 322 will determine the number of users for a current or first upper-limit for the MU-MIMO group. For example, the MU-MIMO upper limit determiner 322 may determine that the first upper limit is eight users. As such, a maximum of eight UEs may be assigned to the MU-MIMO group based on the first upper limit. The maximum number of users that may be assigned to the MU-MIMO group may vary and any and all combinations are contemplated herein.

Once the MU-MIMO upper limit determiner 322 determines what the first upper limit is, the MU-MIMO group modifier 326 will modify the first upper limit of the quantity of users permitted to be assigned to communicate using the MU-MIMO group to a second upper limit based on the determination that the SPR of the first node exceeds a predetermined threshold. For example, if the first upper limit for the MU-MIMO group was eight users, the MU-MIMO group modifier 326 could modify the first upper limit by increasing the maximum number of users allowed to 16 UEs, resulting in the second upper limit. As such, the second upper limit of the maximum number of user devices permitted to be assigned to the MU-MIMO group will increase.

Once the first upper-limit of the MU-MIMO group has been modified to the second upper limit, the MU-MIMO group assignor 324 will re-assign at least one UE previously assigned to a single user MIMO to the MU-MIMO group. The number of UEs reassigned to the MU-MIMO group will not exceed the second upper limit. In other words, using the example above, if eight UEs were previously assigned to the MU-MIMO group under the constraints of the first-upper limit, an additional eight more UEs may now be assigned to the MU-MIMO group without exceeding the second upper limit. This does not mean that eight UEs will necessarily be assigned though. Depending on the situation, as few as one additional or as many as eight additional UEs may be assigned without exceeding the second upper limit.

In further aspects, in addition to modifying the first upper-limit, a criteria identifier 328 determines that at least one criteria for the one or more UEs exceeds a first predetermined threshold. It is contemplated that the criteria identified by criteria identifier 328 may be any criteria that impact the wireless communication session between the UE and the antenna array. In some aspects, the at least one criteria identified may be the angular separation between one or more UEs within the geographic area. In other aspects, the criteria may be the amount of data to be transmitted from the one or more UEs to a base station. The criteria identifier 328 identifies that more than one criteria exceeds the first predetermined threshold for each criteria. For example, the criteria identifier 328 may determine that the angular separation between is 15 degrees and the first predetermined threshold is 10 degrees. As such, the angular separation is greater than the first predetermined threshold of 10 degrees. In such instances, a criteria threshold modifier 330 will modify the predetermined threshold to a second predetermined threshold. In this instance, the criteria threshold modifier 330 would modify the first predetermined threshold from 10 degrees to 20 degrees. This increase in the predetermined threshold may allow more UEs to join the MU-MIMO group. In other instances, the first predetermined threshold for angular separation may be 15 degrees while criteria threshold modifier 330 may modify the criteria to set the predetermined threshold to 7 degrees.

Based on this modification, a device determiner 332 will determine one or more UEs now eligible to be assigned to the MU-MIMO group from a single user MIMO. This relaxation of the predetermined threshold will allow devices that could not previously join the MU-MIMO group to do so, opening up more resources for other UEs in the geographic area. In this instance, the number of UEs re-assigned to the MU-MIMO group will still not exceed the second upper limit of the number of UEs permitted to join the MU-MIMO group. As such, not all devices that are eligible to join are able to. For example, if based on modification of the criteria threshold by the criteria threshold modifier 330, the angular separation threshold is increased, the device determiner 332 may determine that 20 UEs are eligible to be assigned to the MU-MIMO group. However, because the limitation of the second upper limit for the MU-MIMO group might be set at 16 users, only a maximum of 16 users may be assigned to the MU-MIMO group. As such, if two UEs were already connected, then only another 14 of the 20 available devices may be assigned to the MU-MIMO group.

As mentioned, the at least one criteria identified by the criteria identifier 328 may alternatively be the amount of data transmitted from one or more UEs to a base station. In this instance, the criteria identifier 328 may determine that the amount of data to be transmitted from the one or more UEs to a base station is greater than the first predetermined threshold. For example, the first predetermined threshold may be 5 MHz of data and the criteria identifier 328 may determine that one or more UEs are transmitting 10 MHz of data. Therefore, the criteria threshold modifier may increase the predetermined threshold to the second predetermined threshold value of greater than 10 MHz of data.

Figure 5:
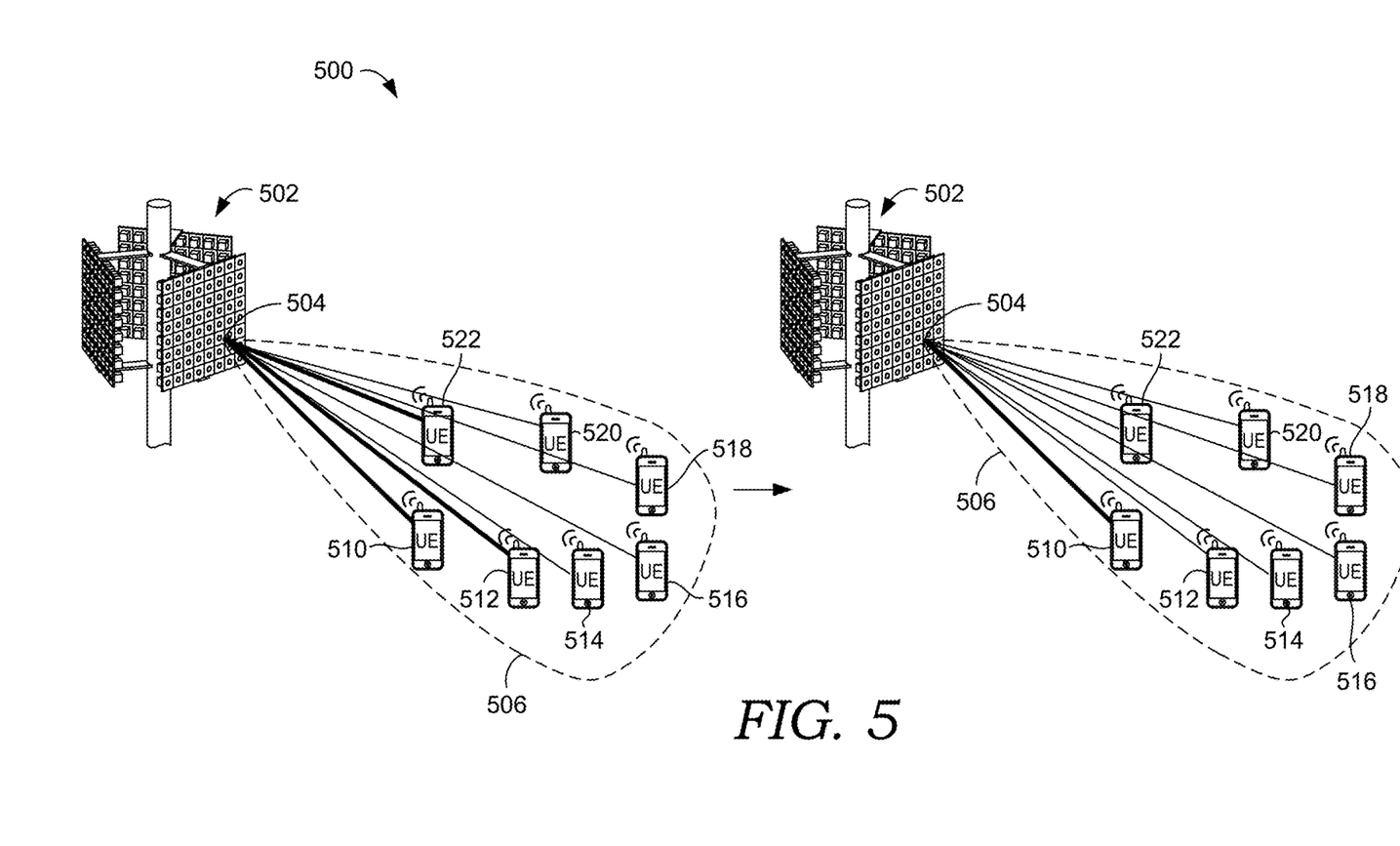
FIG. 5 depicts an exemplary environment wherein implementations of the present disclosure may be employed.

Next, FIG. 5 illustrates exemplary environment 500 wherein implementations of the present disclosure may be employed. As shown, FIG. 5 includes a cell site 502, antenna 504, service beam 506, and several UEs 510, 512, 514, 516, 518, 520, and 522. In aspects, the one or more antennas 504 may be dipole antennas, having a length, for example, of ¼, ½, 1, or 1½ wavelength. Antenna 504 may be an active antenna array, FD-MIMO, massive MIMO, 3G, 4G, 5G, and/or 802.11. While we refer to dipole antennas herein, in other aspects, one or more antennas 504 may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the antenna 504 may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, antenna 504, may comprise 64 antenna elements arranged in an 8×8 structure. In other aspects, the antenna 504 may comprise antenna elements arranged in an 8×4, 4×8, or 4×4 configuration. Each antenna element of the antenna 504 comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the antenna 504 may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard.

In the aspect depicted in FIG. 5, the antenna 504 can include 64 antenna elements each with a distinct direction which may be known, and where each antenna element is capable of communicating with one or more devices, e.g., using one or more specific beams, each identifiable as a beam index, as referred to herein, in aspects. In the same or alternative aspects, a UE may communicate with more than one antenna element of the antenna 504. In aspects, using the methods and systems disclosed herein with a high-density antenna array, such as the antenna 504, and using a 5G wireless communication protocol as an example, can facilitate the strategic assignment of beam indices and/or allotment of beam indices tailored for a specific purpose or environment.

As shown, the antenna 504 generates a service beam 506 that covers a portion of a service area. Likewise, additional antenna arrays (not shown) also generate additional service beams. Each service beam 506 corresponds to a radiation pattern of a corresponding cell site 502. The shape, size, and dimension(s) of the service coverage area of cell site 502 generally is determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each antennas. Each antenna wirelessly receives and transmits RF transmissions to and from, for example, user equipment, other antennas, other cell sites, base stations, and/or satellites, in order to facilitate communications between such devices.

In some embodiments, the location determiner 316, in communication with cell site 502, may detect when a UE, such as UE 516, enters an area covered by one or more antenna elements of an antenna array, e.g., the antenna 504 of the cite site 502 of FIG. 5. In some embodiments, UEs may detect and/or measure one or more signals, e.g., synchronizations signals, from the antenna array when entering an area covered by the one or more antenna elements of the antenna array.

FIG. 5 shows the system managing UEs served by an MU-MIMO group as disclosed herein. In the first image, UEs 510, 512, and 522 are assigned to a single user MIMO (shown by the thicker black line) while UEs 514, 516, 518, and 520 are assigned to an MU-MIMO group. The location determiner 316 works to determine the location of each of the UEs within the geographic area shown. Then, the SPR calculator 318 will determine the SPR value for the first node and the SPR determiner 320 determines whether the SPR of the first node exceeds a predetermined threshold. For example, if the predetermined threshold for SPR is 5%, the SPR determiner 320 may determine that the SPR of the first node is 7%. Based on this determination, the MU-MIMO upper limit determiner 322 will determine what the first upper limit for the MU-MIMO group is. In this instance, the MU-MIMO group first upper limit is shown as having four UEs. Based on the determination that the SPR calculated for the first node is greater than the predetermined threshold of 5%, the MU-MIMO group modifier 326 will modify the first upper limit to a second upper limit for the MU-MIMO group. In this case, the MU-MIMO group modifier will modify the MU-MIMO second upper limit to seven devices. Based on this, the MU-MIMO group assignor 324 will re-assign UEs 512 and 522 from a single user MIMO to the MU-MIMO group. UE 510 will remain on the single user MIMO. While the second upper limit for the MU-MIMO group shown in FIG. 5 is described as being seven UEs, in other instances, the second upper limit of the maximum number of devices that can be assigned to the MU-MIMO group may be less or greater than seven devices but no more than 16 devices. Additionally, the SPR predetermined threshold may be greater or less than 5%. It is noted that the values discussed herein are for exemplary purposes only. Further, as previously discussed, the system may also take into account at least one criteria and base the reassignment of UEs from a single user MIMO to an MU-MIMO group based on the determination that at least one criteria is determined to be above a first threshold for the one criteria.

Figure 6:
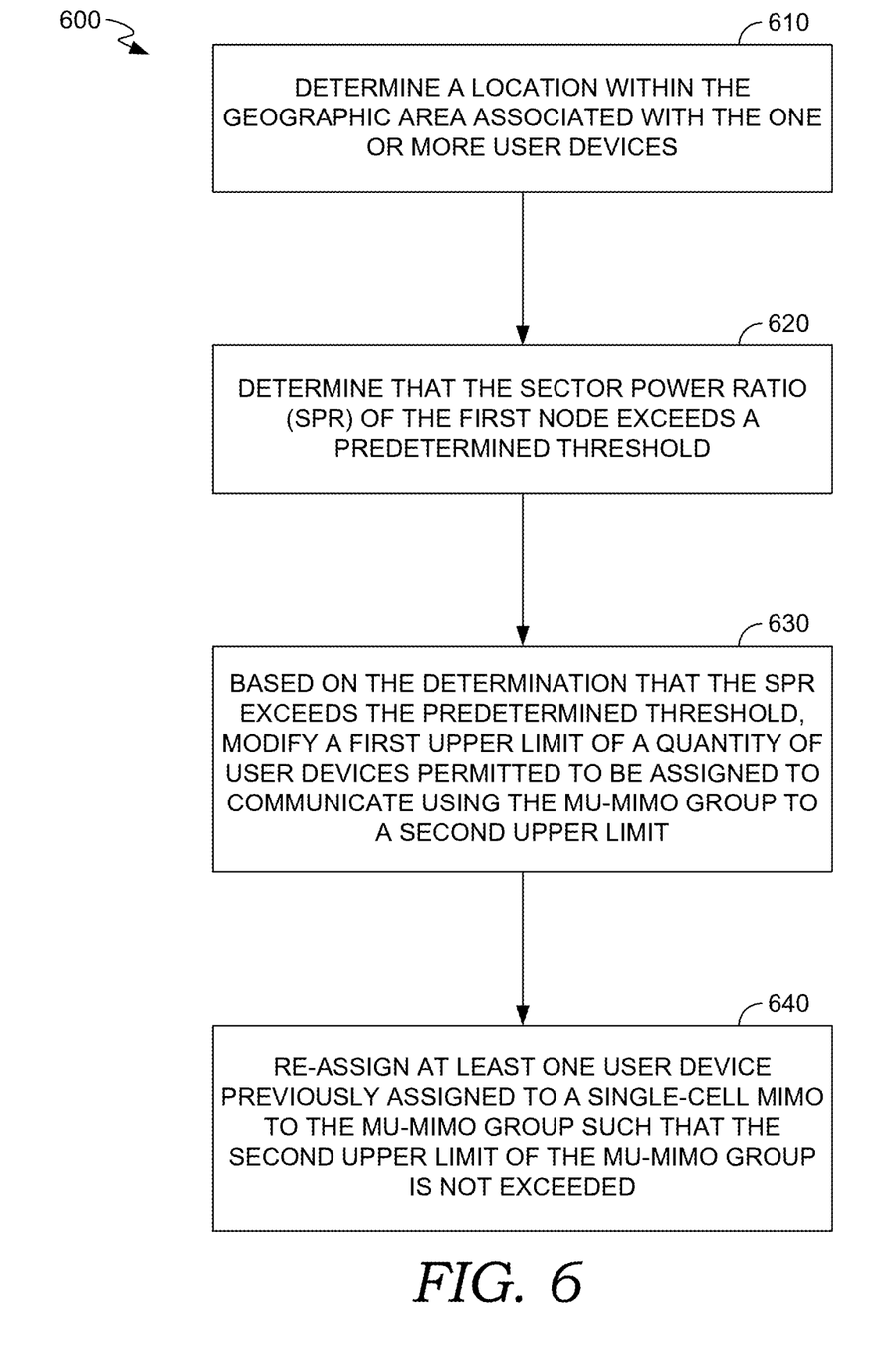
FIG. 6 depicts a flow diagram of an exemplary method, in accordance with an embodiment of the present invention.

FIG. 6 illustrates an exemplary flow diagram 600 comprising an exemplary method for managing UEs served by an MU-MIMO grouping. First, at block 610, a location within a geographic area for one or more UEs is determined by location determiner 316. Then, the SPR calculator 318 calculates an SPR value for the first node and the SPR determiner 320 determines that the SPR of the first node is above a threshold at block 620. Based on determining that the SPR for the first node exceeds the predetermined threshold, the MU-MIMO upper limit determiner 322 determines the first upper limit of the MU-MIMO group and the MU-MIMO group modifier 326 modifies the first upper limit to the second upper limit, increasing the number of UEs permitted to be assigned to the MU-MIMO group at block 630. Following that, the MU-MIMO group assignor 324 re-assigns at least one UE that was previously assigned to a single user MIMO to the MU-MIMO group such that the second upper limit of the MU-MIMIO group is not exceeded at block 640.

Additionally, in some aspects, the method further includes the criteria identifier 328 identifying at least one criteria for the at least one device communicating with the first node (not shown in FIG. 6). As mentioned, the at least one criteria may be, for example, angular separation or the amount of data to be transmitted. Then, the criteria identifier 328 will determine that the at least one criteria identified for the at least one device exceeds the first predetermined threshold. Following this, the criteria threshold modifier 330 will modify the first predetermined threshold for the at least one device to a second predetermined threshold. Then, the device determiner 332 will determine which UEs are eligible to be re-assigned to the MU-MIMO group from a single user MIMO.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system for managing user devices (UEs) served by a multi-user (MU) MIMO group, the system comprising:
at least a first node, the first node configured to wirelessly communicate with one or more UEs in a geographic area; and
one or more processors configured to perform operations comprising:
determining a location within the geographic area associated with the one or more UEs;
determining that a sector power ratio (SPR) of the first node exceeds a predetermined threshold;
based on determining that the SPR exceeds the predetermined threshold, modifying a first upper limit of a quantity of UEs permitted to be assigned to communicate using an MU-MIMO group to a second upper limit; and
re-assigning at least one UE previously assigned to a single user MIMO to the MU-MIMO group such that the second upper limit of the MU-MIMO group is not exceeded.

2. The system of claim 1, further comprising continually monitoring a current sector power ratio value of the first node to determine when to re-assign one or more users from the single user MIMO to the MU-MIMO group.

3. The system of claim 1, wherein the first node utilizes a 5G first wireless communication protocol.

4. The system of claim 1, wherein the one or more processors are further configured to calculate an angular separation value for the one or more UEs.

5. The system of claim 4, wherein the angular separation value is determined to be equal to or greater than a predetermined threshold.

6. The system of claim 5, wherein the predetermined threshold for the angular separation value is 15 degrees.

7. The system of claim 6, wherein the one or more processors are further configured to modify the predetermined threshold for the angular separation value.

8. The system of claim 7, wherein the predetermined threshold for the angular separation value is modified to at least 7 degrees.

9. The system of claim 1, wherein the second upper limit of the quantity of UEs permitted to be assigned to communicate using the MU-MIMO group is greater than the first upper limit.

10. A system for managing user devices (UEs) served by a multi-user (MU) MIMO group, the system comprising:
at least a first node, the first node configured to wirelessly communicate with one or more UEs in a geographic area; and
one or more processors configured to perform operations comprising:
determining a first upper limit of a quantity of UEs permitted to be assigned to communicate using an MU-MIMO group;
determining that a sector power ratio (SPR) of the first node exceeds a predetermined threshold;
based on determining that the SPR exceeds the predetermined threshold, modifying the first upper limit of a number of UEs permitted to be assigned to communicate using the MU-MIMO group to a second upper limit;
identifying at least one criteria for the one or more UEs;
determining that the at least one criteria for the one or more UEs exceeds a first predetermined threshold;
modifying the first predetermined threshold for the at least one criteria for the one or more UEs to a second predetermined threshold;

based on modifying the first predetermined threshold for the at least one criteria for the one or more UEs, determining one or more UEs eligible to be reassigned to the MU-MIMO group from a single user MIMO; and reassigning at least one of the one or more UEs previously assigned to the single user MIMO to the MU-MIMO group such that the number of UEs assigned to communicate using the MU-MIMO group does not exceed the second upper limit of the number of UEs permitted to be assigned to communicate using the MU-MIMO group.

11. The system of claim 10, wherein the predetermined threshold for the SPR and the first predetermined threshold for the at least one criteria is set by a network operator.

12. The system of claim 10, wherein the first node utilizes a 5G first wireless communication protocol.

13. The system of claim 10, wherein the at least one criteria regarding the one or more UEs is an angular separation value determined between the one or more UEs within the geographic area.

14. The system of claim 10, wherein the at least one criteria regarding the one or more UEs identified is an amount of data to be transmitted from the one or more UEs to the first node.

15. The system of claim 14, wherein the second predetermined threshold for the amount of data to be transmitted from the one or more UEs to a base station is greater than the first predetermined threshold amount of data to be transmitted from the one or more UEs to the base station.

16. The system of claim 10, wherein the first upper limit of the number of UEs permitted to be assigned to communicate using the MU-MIMO group is eight UEs.

17. The system of claim 10, wherein the second upper limit of the number of UEs permitted to be assigned to communicate using the MU-MIMO group is 16 UEs.

18. The system of claim 10, wherein the second upper limit of the number of UEs permitted to be assigned to communicate using the MU-MIMO group is greater than the first upper limit.

19. A method for managing user devices (UEs) served by a multi-user (MU)-MIMO group, the method comprising:

determining that a sector power ratio (SPR) of a first node exceeds a predetermined threshold;

based on determining that the SPR exceeds the predetermined threshold, modifying a first upper limit of a quantity of UEs permitted to be assigned to communicate using an MU-MIMO group to a second upper limit; and re-assigning at least one UE previously assigned to a single user MIMO to the MU-MIMO group such that the second upper limit of the MU-MIMO group is not exceeded.

20. The method of claim 19, further comprising:

identifying at least one criteria for at least one device that communicates with the first node;

determining that the at least one criteria for the at least one device exceeds a first predetermined threshold; and modifying the first predetermined threshold for the at least one criteria regarding the at least one device to a second predetermined threshold.

* * * * *